US008083087B2

(12) United States Patent
Asterlin et al.

(10) Patent No.: US 8,083,087 B2
(45) Date of Patent: Dec. 27, 2011

(54) VESSEL LOCK DOWN SYSTEM

(75) Inventors: Gunther E. Asterlin, South Bend, IN (US); H. William Morgan, Jr., Centre Hall, PA (US)

(73) Assignee: Filter Specialists, Inc., Michigan City, IN (US)

( * ) Notice: Subject to any disclaimer, the term of this patent is extended or adjusted under 35 U.S.C. 154(b) by 257 days.

(21) Appl. No.: 12/448,317

(22) PCT Filed: Dec. 20, 2006

(86) PCT No.: PCT/US2006/048579
§ 371 (c)(1),
(2), (4) Date: Jul. 29, 2009

(87) PCT Pub. No.: WO2008/079109
PCT Pub. Date: Jul. 3, 2008

(65) Prior Publication Data
US 2010/0044379 A1    Feb. 25, 2010

(51) Int. Cl.
*B65D 43/26* (2006.01)
(52) U.S. Cl. ........ 220/263; 220/296; 220/820; 220/324; 248/907

(58) Field of Classification Search .................. 220/211, 220/263, 296, 301, 908, 820, 821, 324, 89.1, 220/366.1; 248/907
See application file for complete search history.

(56) References Cited

U.S. PATENT DOCUMENTS

| | | | | |
|---|---|---|---|---|
| 2,583,073 | A | | 1/1952 | Ahlborn |
| 3,311,255 | A | * | 3/1967 | Loveless ........................ 220/324 |
| 3,488,883 | A | | 1/1970 | Clements et al. |
| 4,102,473 | A | | 7/1978 | Draxler |
| 4,381,879 | A | | 5/1983 | Ehrenfels et al. |
| 5,143,389 | A | | 9/1992 | Jonkers |
| 5,918,756 | A | * | 7/1999 | Morgan ........................ 220/263 |

FOREIGN PATENT DOCUMENTS

| | | |
|---|---|---|
| CH | 188498 | 3/1939 |
| DE | 1065323 | 1/1958 |
| DE | 1625988 | 8/1970 |
| FR | 1338183 | 8/1963 |

* cited by examiner

*Primary Examiner* — Stephen Castellano
(74) *Attorney, Agent, or Firm* — Botkin & Hall, LLP

(57) ABSTRACT

A pressure vessel includes a lid being rotatable into an unlocked position by a first actuator and then raised vertically above its housing by a second actuator secured along the housing. A pressure safety latch is provided to both vent the vessel before the Hd is moved into its unlocked position and release the lid for unlocking rotatable movement.

5 Claims, 8 Drawing Sheets

VESSEL LOCK DOWN SYSTEM

BACKGROUND OF THE INVENTION

1. Field of the Invention

This invention relates to a liquid filter and will have particular application to pressurized filtration vessels.

2. Description of the Background of the Invention

The following description describes a pressure vessel which is an improvement upon the vessel and vessel lock-down system disclosed in U.S. Pat. No. 5,918,756. The content and disclosure of the aforementioned patent is incorporated herein by reference.

SUMMARY OF THE INVENTION

The present invention is a lock-down system for a pressurized filtration vessel in which the vessel lid may be locked and unlocked from the vessel housing. The vessel housing carries a davit arm which extends over the vessel and supports the lid. The housing includes an upper cylindrical portion which engages the lower cylindrical side edge of the lid. The plurality of radially extending catch members are disposed at intervals above the housing cylindrical portion. A corresponding plurality of hook-shaped retaining members extends downwardly from the lid side edge to overly the cylindrical portion of the housing when the lid is lowered onto the housing. With the lid situated on the housing, a drive is provided between the housing and the lid and when activated causes the lid to rotate with the retaining members engaging the catch members to draw the lid downwardly into sealing engagement with the housing. The lid is removed by reversing the direction of this drive and operating a lift piston which is located along the side of the housing and which raises the lid after its opening rotating movement upwardly so as to provide clearance for exchanging the filtration elements within the vessel housing.

Accordingly, it is an object of this invention to provide a vessel lock-down system for a pressurized filtering vessel in which the lid can be quickly attached and detached from the vessel housing.

Another object of this invention is to provide a vessel lock-down system for a liquid filtration vessel in which the lid when unlocked from the housing may be extended directly upwardly to expose the interior of the vessel housing.

Still another object of this invention is to provide a pressurized filtration vessel having a pressure release safety latch assembly for the purpose of depressurizing the vessel before the lid is unlocked.

And still another object of this invention is to provide a pressurized filtration vessel that is safe to use.

And still another object of this invention is to provide a pressurized filtration vessel that includes shielding to reduce outer spray from the interior of the vessel upon opening of the vessel lid.

Other objects of this invention will become apparent upon a reading of the following description.

BRIEF DESCRIPTION OF THE DRAWINGS

A preferred embodiment of this invention has been chosen for purposes of illustration and description wherein.

DETAILED DESCRIPTION OF INVENTION

The preferred embodiment illustrated is not intended to be exhaustive or to limit the invention to the precise form disclosed. It is chosen to describe and best illustrate the invention and to enable one having ordinary skill in the art to utilize the invention.

Figure 5:
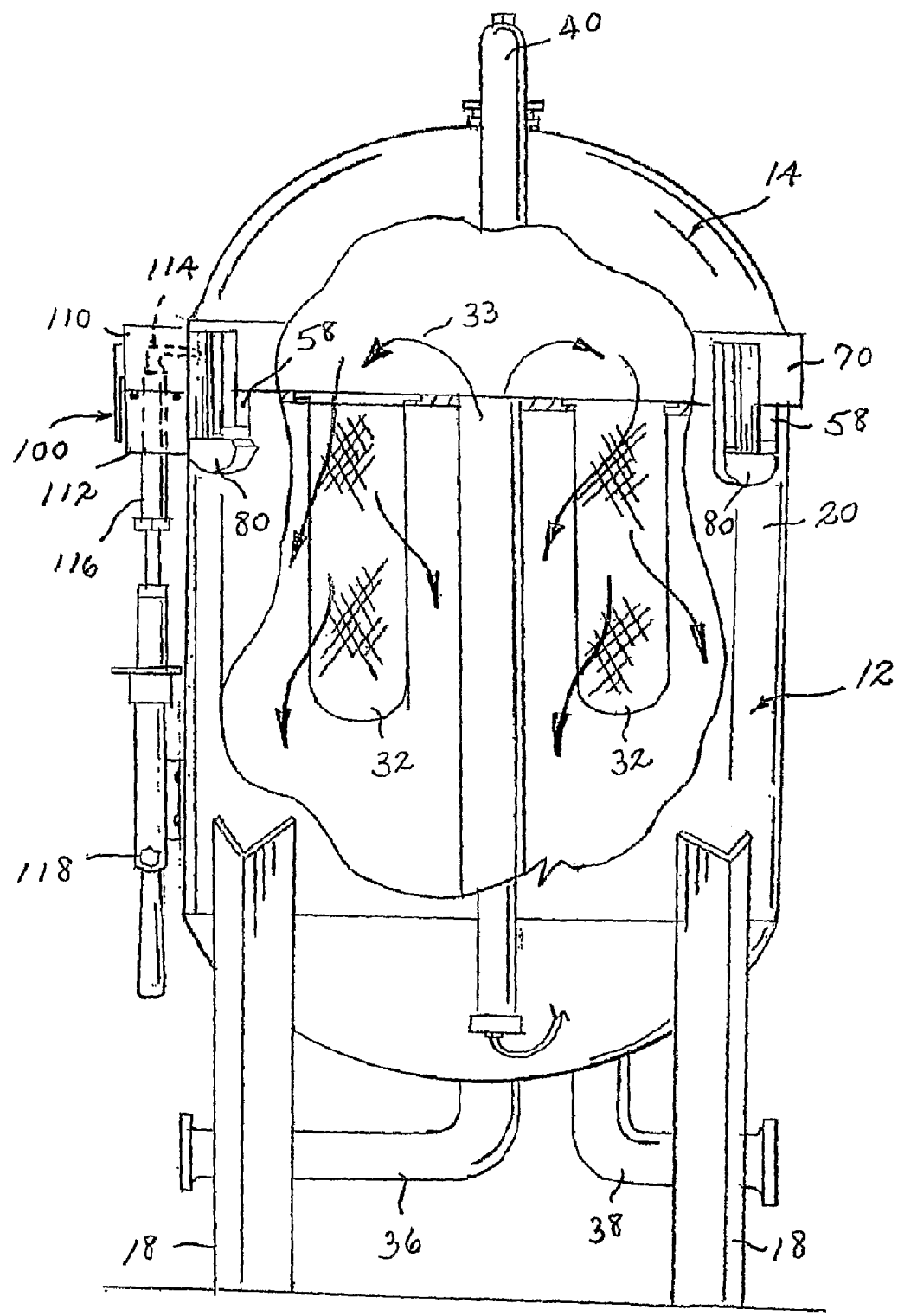
FIG. 5 is an elevational view of the pressure vessel with a portion of the vessel lid and housing removed for illustrative purposes to show fluid flow through the vessel.
Figure 10:
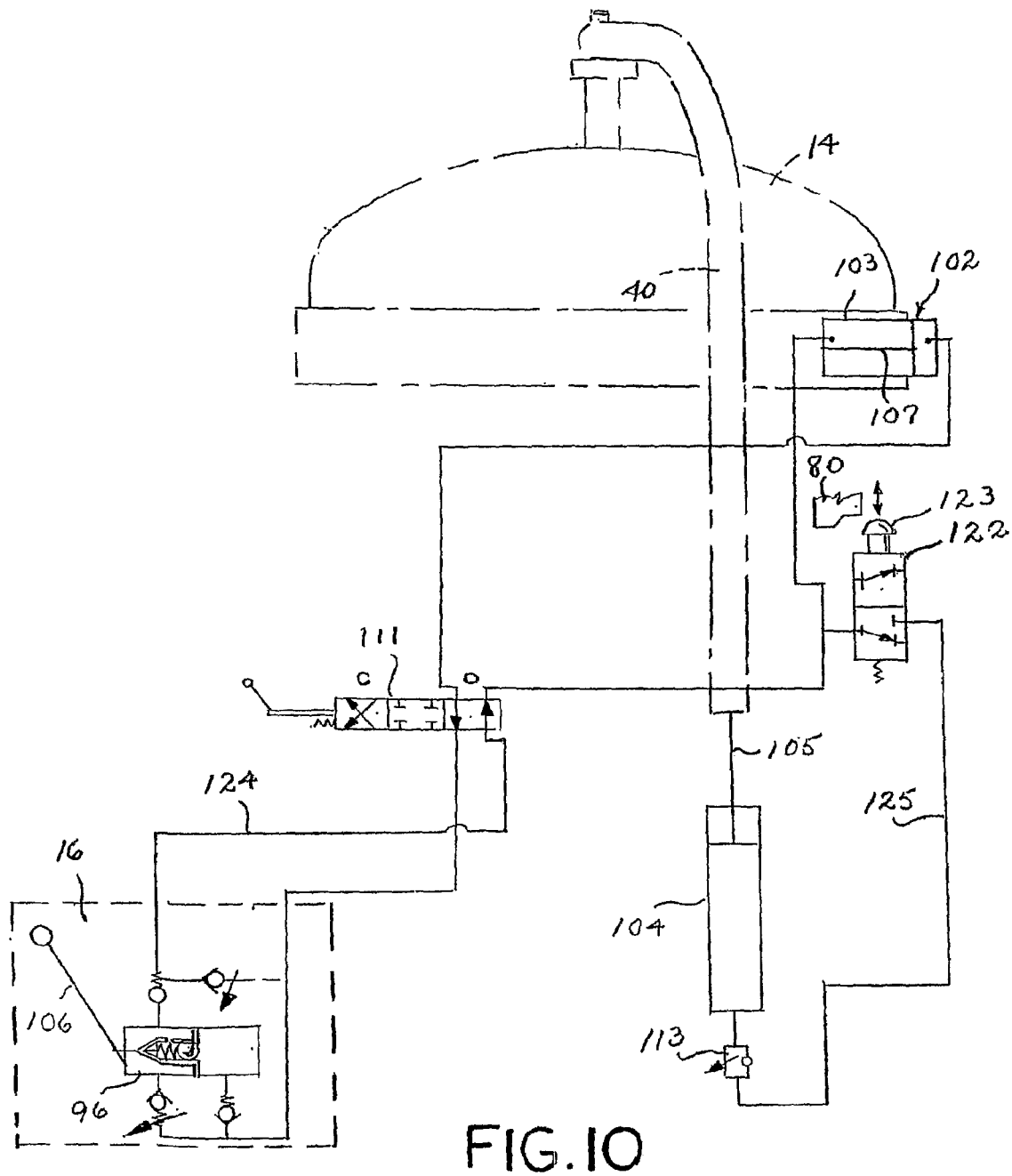
FIG. 10 is a hydraulic fluid flow diagram showing the actuating and flow control elements of the invention.

Pressure vessel 10 of the subject invention includes a body or housing 12, a lid 14 and a hydraulic actuation or control system 16, best shown in detail in FIG. 10. Housing 12 is supported by legs 18 and includes a cylindrical side wall 20 and upper cylindrical portion 24. Cylindrical portion 24 carries an o-ring 30 which provides a seal between lid 14 and housing 12 when the lid is in its closed and locked position. A plurality of filter bags 32 or similar filtration elements are supported within housing 12. Liquid flow represented by arrows 33 in FIG. 5 enters the vessel by way of inlet pipe 36, flowing upwardly above and then downwardly into and through the filter bags 32 and thereafter out of the vessel by way of outlet pipe 38.

Figure 1:
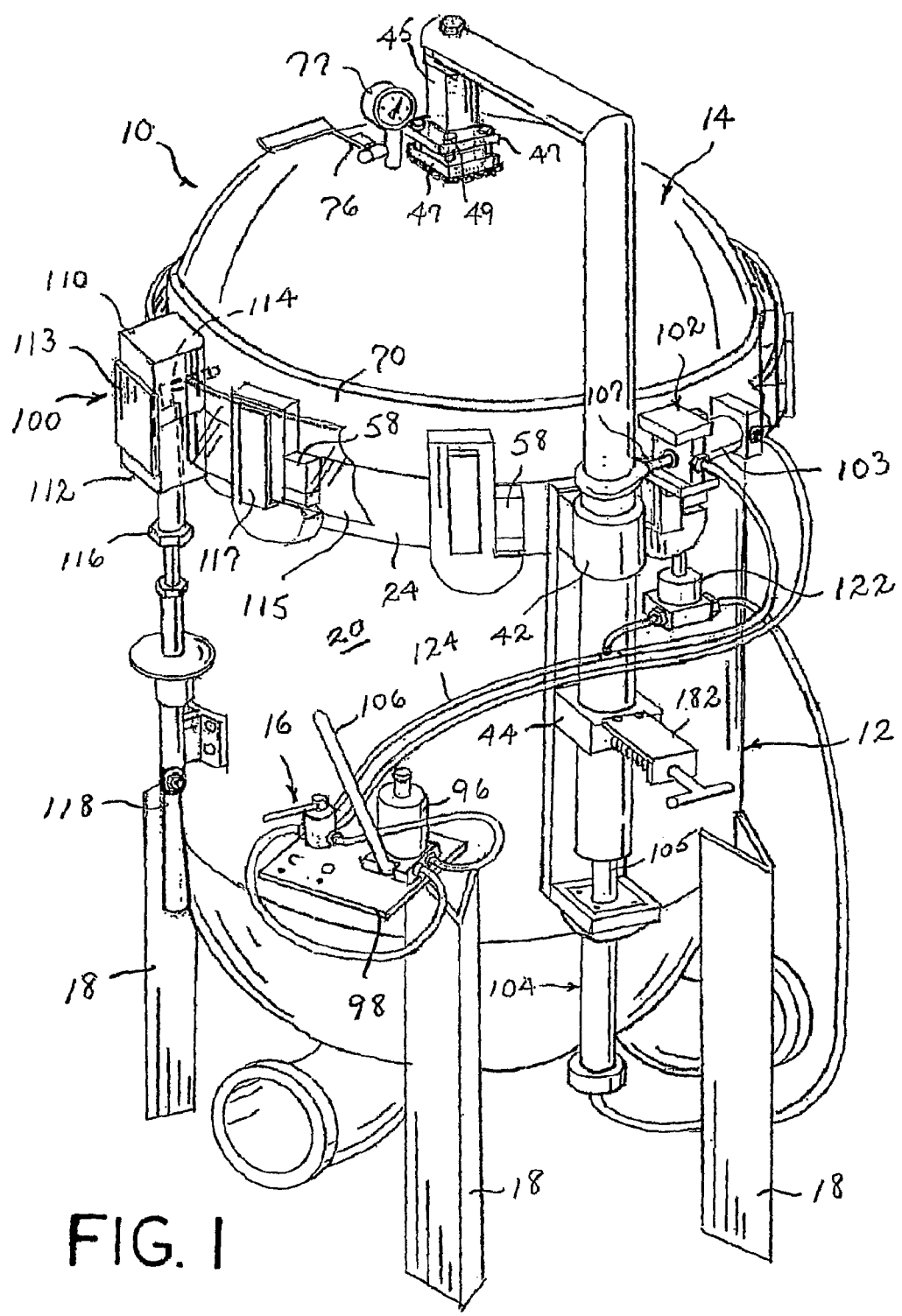
FIG. 1 is a perspective view of a pressure vessel incorporating the lock down system of this invention.
Figure 2:
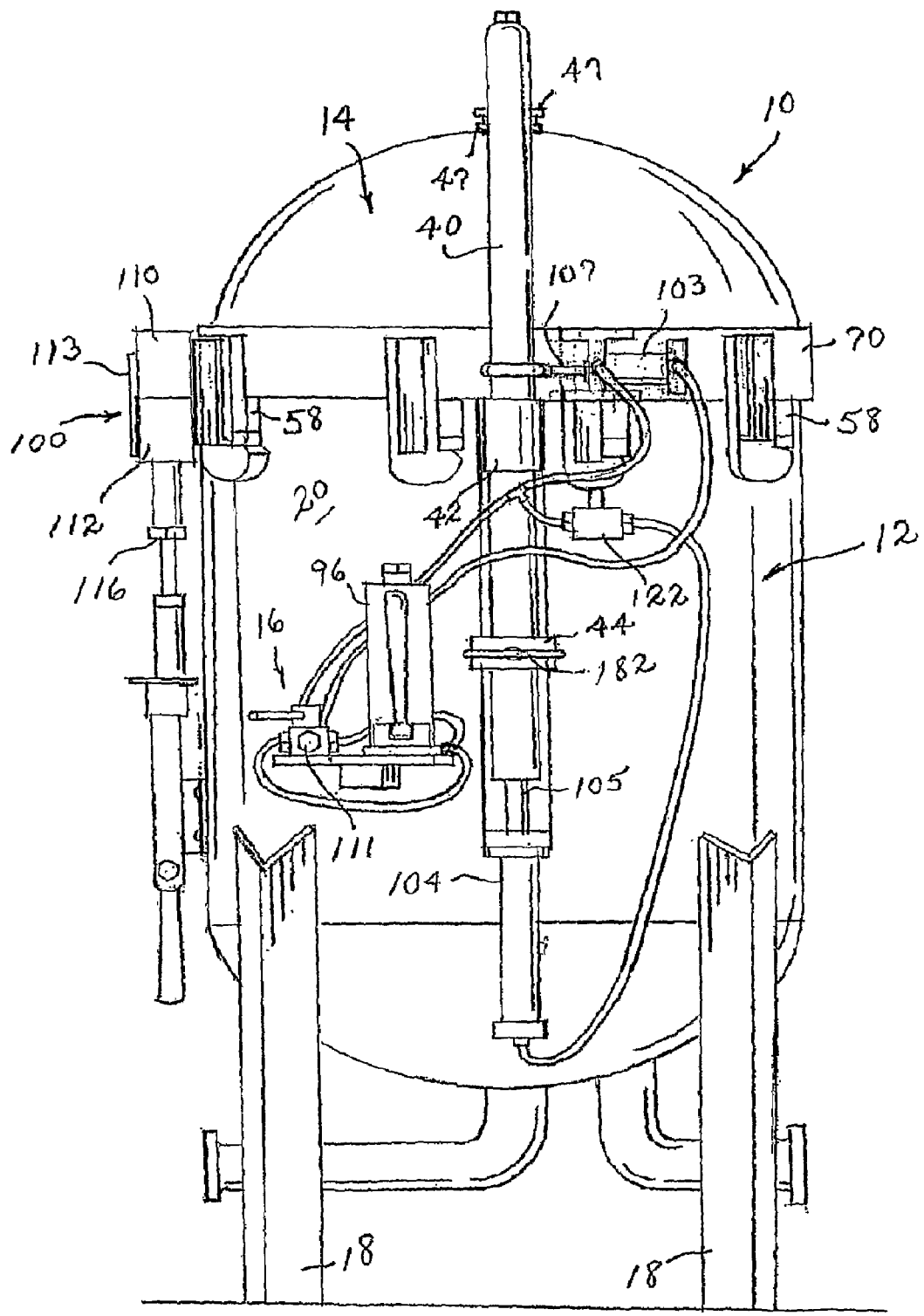
FIG. 2 is a side view of the pressure vessel.
Figure 3:
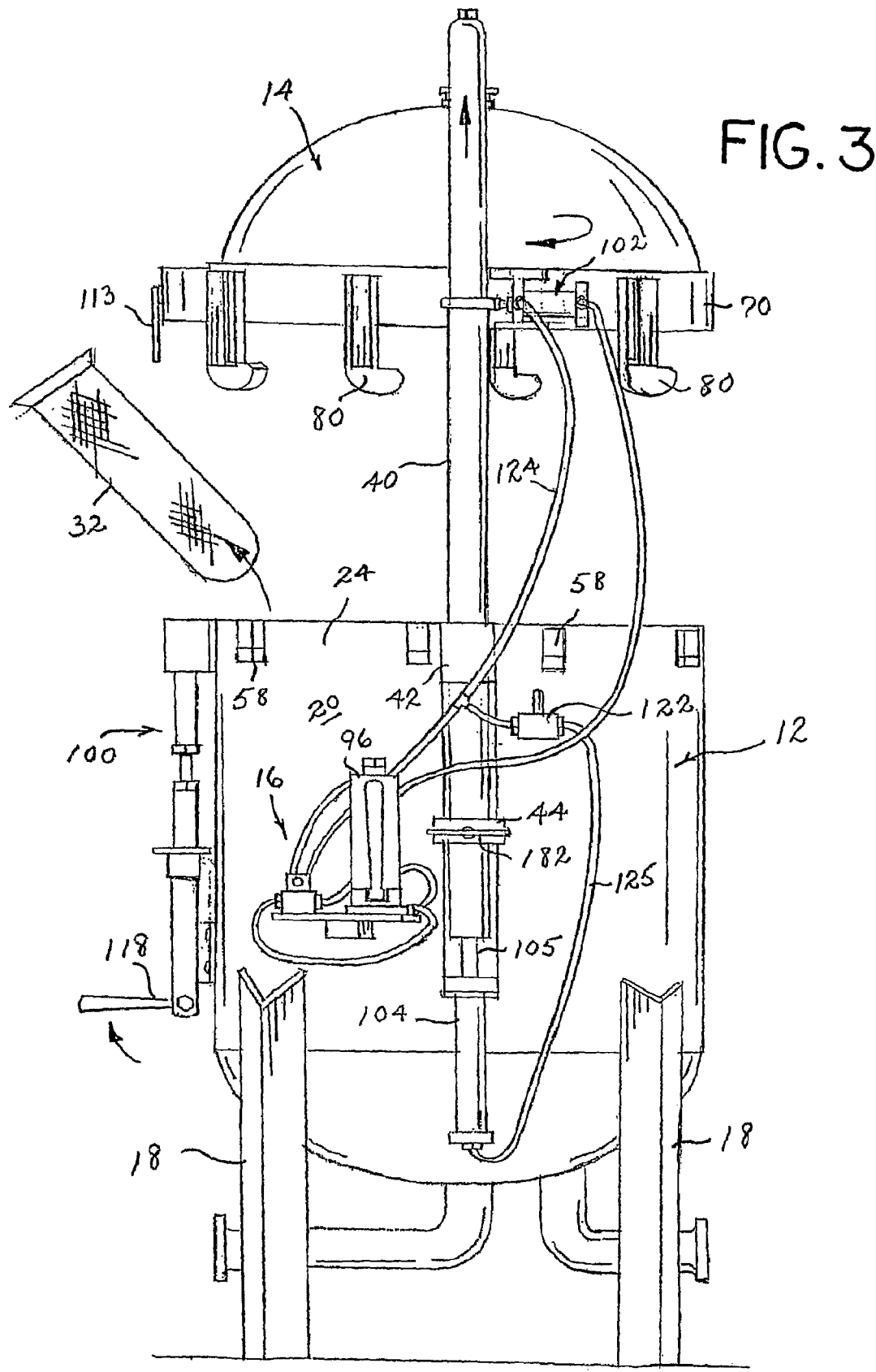
FIG. 3 is a side view of the pressure vessel showing the lid unlocked and raised and a filtration element being removed for illustrative purposes.
Figure 4:
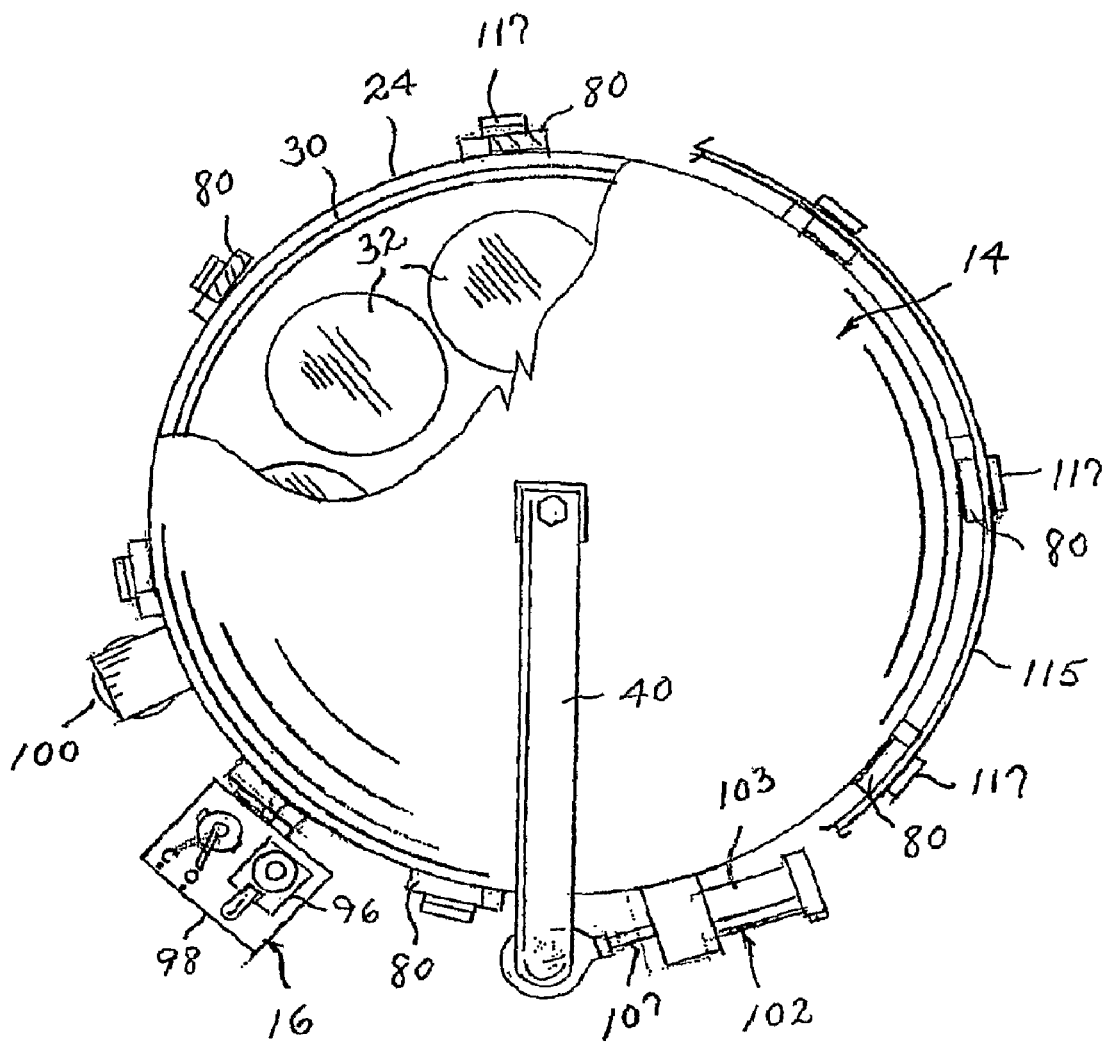
FIG. 4 is a top plan view of the pressure vessel with a portion of the vessel lid fragmented for illustrative purposes, showing the filtration elements within the vessel housing.

A davit arm 40 is supported for extended and retracted vertical movement at the side wall 20 of vessel housing 12 by an upper sleeve bracket 42 and a lower sleeve bracket 44. Davit arm 40 at its upper free end is connected to and supports lid 14. In FIGS. 1 and 2, the davit arm is in its retracted position with the lid 14 seated upon housing 12. In FIG. 3, the davit arm is in its extended position, lifting the lid 14 from the vessel housing 12 so as to expose the interior of the housing, thereby allowing filter bags 32 to be removed and replaced.

A plurality of lugs or catch members 58 are attached to the outer surface of cylindrical portion 24 of the vessel housing 12. Each of the catch members 58 includes an inclined cam surface 68. Catch members 58 are spaced at substantially equal angular intervals about cylindrical portion 24 with all cam surfaces 68 in the same plane which is substantially parallel to the top wall 26 of the vessel housing 12.

A plurality of hook-shaped retaining members 80, each having or including a finger 84, are attached to the lid side edge 70 at spaced angular intervals corresponding to the spacing of catch members 58 attached to vessel housing 12. Each retaining member finger 84 has an inclined cam surface 92. The relationship and manner of operation of catch members 58 and retaining members 80 are more fully described in U.S. Pat. No. 5,918,756 which has been incorporated by reference.

Mounted to the top of lid 14 is a venting device 76 in association with a pressure gauge 77. The pressure gauge 77 reads the internal pressure within the vessel when the lid 14 is secured and locked to the vessel housing 12 and the vessel is in filtering operation. Venting device 76 is used to vent the interior of the vessel prior to the unlocking and lifting of the lid.

Mounted to one side of vessel housing 12 is a pressure relief safety latch 100. An upper latch part 110 is connected to side edge 70 of the lid and a lower latch part 112 is connected to cylindrical portion 24 of housing 12 with, preferably, an o-ring that is carried by the lower latch part so as to provide a seal between the upper and lower latch parts when the parts are in vertical overlying alignment as illustrated in FIG. 1. A vented opening 114 into the interior of lid 14 extends through upper latch part 110. Vented opening 114 terminates in a nozzle end within the interior of upper latch part 110. A plunger 116 fits slideably within lower latch part 112 and is shiftable upwardly into sealing engagement with a nozzle end of opening 114 in the upper latch part when the latch parts are in vertical alignment. Plunger 116 is secured by a toggle clamp 118 to the side wall 20 of vessel housing 12. During normal operative operation, plunger 116 extends into upper latch part 110, sealing opening 114 and preventing lateral movement, and thus opening movement of lid 14, between the upper and lower latch parts. Upon the actuation of toggle 118, plunger 116 is withdrawn from the interior of upper latch part 110, permitting venting of the interior of the vessel through opening 114 and along a keyslot along the plunger to the atmosphere, allowing lateral movement of the upper and lower latch parts relative to each other as lid 14 is rotated into its open position. In this manner, pressure relief safety latch 100 prevents premature opening of lid 14 until the interior of the housing vessel has been appropriately vented.

The hydraulic control 16 is shown schematic form in FIG. 10 and includes a pump 96 which is carried upon a table 98 connected to housing 12. Appropriate tubing for the hydraulic fluid pumped by pump 96 connects various operative components, namely, a drive assembly 102 for rotating lid 14 relative to housing 12; and a lift or cylinder 104 for raising lid 14 relative to housing 12. Pump 96 is manually operated through a handle 106. The hydraulic fluid that flows through tubing 124 is controlled by control valve 111. Cylinder 104 is connected between housing 12 and the lower end of davit arm 40 which is guided in vertical orientation for sliding movement by upper sleeve bracket 42 and lower sleeve bracket 44. The piston rod 105 of cylinder 104 when extended and retracted causes the raising and lowering respectively of the davit arm 40 relative to housing 12. Drive assembly 102 which rotates lid 14 includes a cylinder 103 which is connected or secured to side edge 70 of lid 14 and whose piston rod 107 is secured to davit arm 40. A pivot connection 45 connects the davit arm to the top of lid 14 so that the lid is rotatable about a vertical axis relative to the davit arm. Therefore, upon actuation of cylinder 103 and the extension and retraction of its piston rod 105, lid 14 rotates relative to the davit arm about a vertical axis. Adjustment plates 47 are connected each of the lid and davit arm and are interconnected by adjustment bolts 49. By turning bolts 49, the spacing between the plates can be varied and the lid leveled with the upper edge of the housing.

Figure 7:
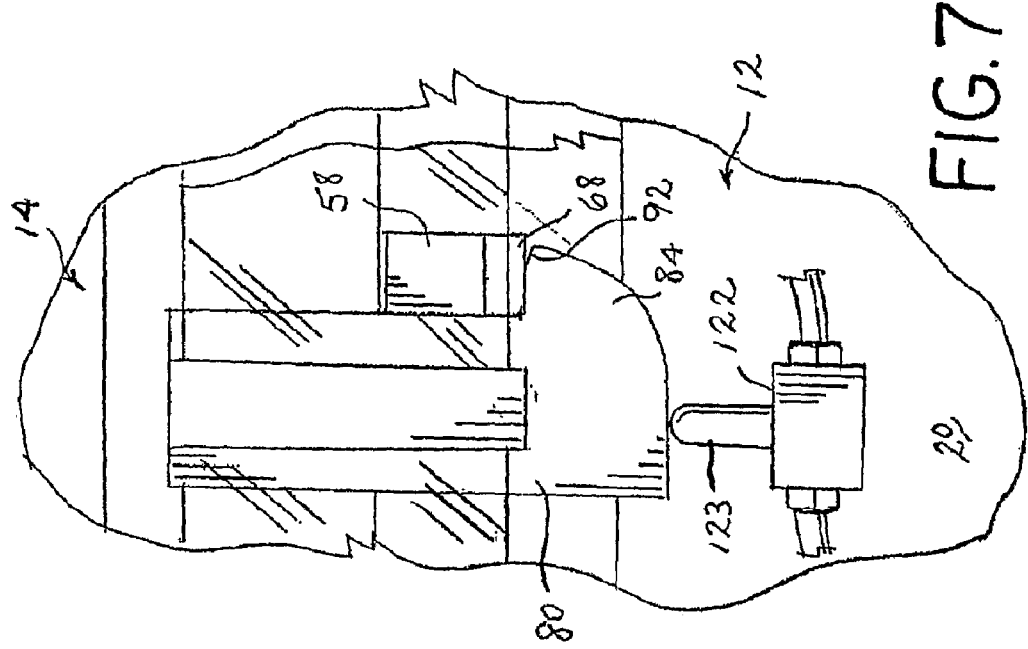
FIG. 7 is a detailed view showing a lid-retaining member lockingly engaged with a catch member of the vessel housing, securing the lid to the housing.
Figure 6:
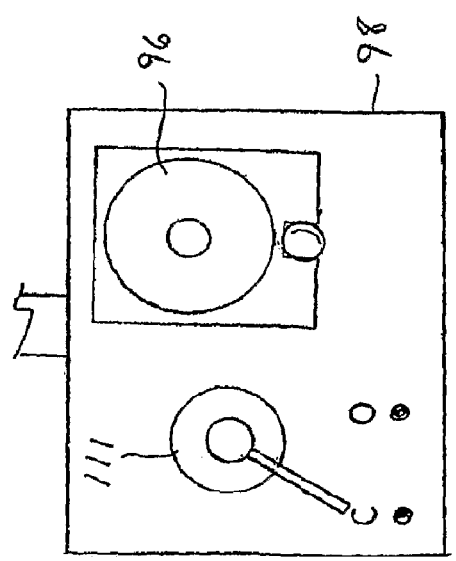
FIG. 6 is a fragmentary view of the hydraulic controls for the pressure vessel as seen from above.
Figure 9:
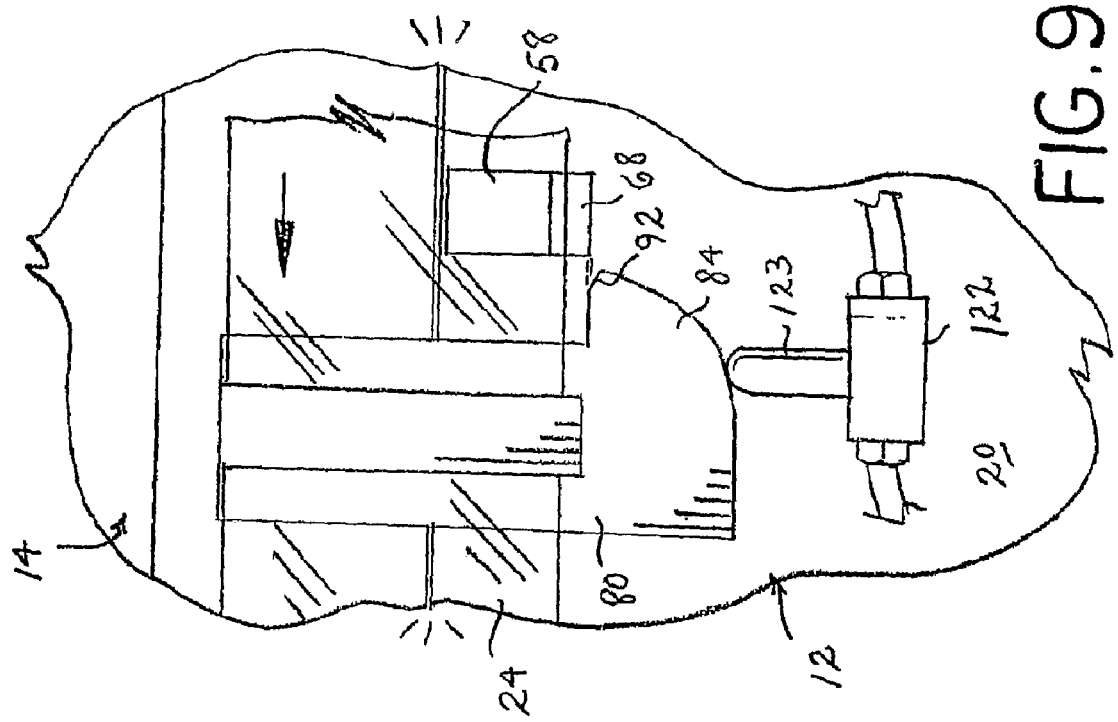
FIG. 9 is a detailed view similar to FIG. 7 but showing the retaining member released from the vessel housing catch member and the lid loosened for lifting.
Figure 8:
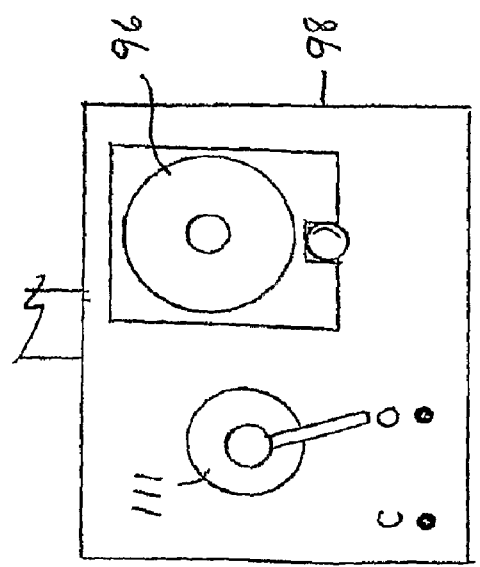
FIG. 8 is a top view of the hydraulic controls showing the actuating lever moved into its open position.

To operate the vessel lock down system of this invention, control valve 111 is biased from its closed position shown in FIG. 6 in which enable valve 122 is depressed by the camming action of the directly overlying retaining member 80 (see FIG. 7) into its open position shown in FIG. 8. At this time the venting device 76 is opened and the pressure relief safety latch 100 is released by the opening of toggle clamp 118 which withdraws plunger 116 from the upper latch part 110, releasing the lid for rotation and venting the interior of the housing. Pump 96 is then actuated by the cranking of handle 106 to cause hydraulic fluid to pass through line 124 and control valve 111 into cylinder 103 which causes the retraction of its piston rod 105 and the resulting clockwise rotation of lid 14 relative to the vessel housing 12. This causes each of the retaining members 80 to slide out from under engagement with overlying catch members 58 so as to free the lid for upward movement relative to the housing. A shield 113 is carried by upper latch part 10 and another shield 115 is flexed about and covers the joint between the lid 14 and housing 12, being retained in clips 117 attached to retaining members 80. Shields 113, 117 serve to deflect any spray coming from within the vessel. As retaining members 80 shift laterally relative to the housing, enable valve 122 passes over the outer surface of the overlying retaining member 80 so that when all engagement members 80 are free from the overlying catch members 58, valve 122 has its probe 123 biased into on extended position to open the valve. With valve 122 now open, the hydraulic fluid provided by pump 96 is diverted into tubing 125 so as to enter cylinder 104. Continued actuation on pump 96 by handle 106 now causes the piston rod 105 of cylinder 104 to extend causing the lifting of davit arm 40 within sleeve brackets 42 and 44 and the raising of lid 14 from housing 12. Continued pumping on pump 96 causes the continued raising of lid 14 until the spring biased catch pin 182 which is carried by housing 20 at the davit arm is spring urged into an opening in the davit arm so as to secure movement of the davit arm relative to the sleeve bracket 44 and thus relative to housing 20. At this time the actuation of pump 96 is ceased.

Once access to the interior of the filter vessel 10 is no longer needed, lid 14 may be lowered. With control valve 111 still in its open position, pump 96 is preferably actuated a few times to slightly further raise the lid and thus relieve the pressure upon catch pin 182. At this time, catch pin 182 is withdrawn from the davit arm 40 and control valve placed in its closed position. This allows for reverse flow of the hydraulic fluid through the control valve 111 and lowering of lid 14 relative to housing 12 by gravity. A flow control valve 113 controls the rate of decent of the lid. Once the lid has been lowered onto housing 12, pump 96 is actuated which causes the reverse flow of hydraulic fluid into cylinder 103 at lid 14 so as to cause the extension of rod 107 and the lid to rotate clockwise relative to housing 12. The retaining members 80 each slide and are cammed under an overlying catch member 58 which draws the lid into sealing engagement with housing 18. At the same time the retaining member 80 adjacent enabled valve 122 contacts and engages its probe 123 causing flow to cylinder 104 to be isolated in preparation for the next raising of the lid. Toggle clamp 118 of pressure relief safety latch 100 is now released to allow its plunger 116 to reenter upper latch part 110 so as to secure the lid against rotating movement relative to housing 12 and to seal vent 114 into the interior of the vessel.

The invention is not to be limited to the detail above given but may be modified in the scope of the amended claims.

What is claimed is:

1. A pressure vessel comprising:
    a housing including a side wall defining an opening into said housing;
    a lid spanning said opening, each of said side wall and lid including mutually engaging parts for securing said lid to said housing when said lid is in a closed position, said lid being rotatable relative to said housing from the closed into an open position whereby the lid can be removed from said housing;
    a drive connected between said lid and housing, whereby the lid can be rotated between its open and closed positions;

a second drive connected to said housing and extending between the housing and said lid for raising the lid relative to the housing to expose said housing opening;

a davit having an upper end secured to said lid and a lower end slidably supported against said housing side wall, said davit lower end shifting upwardly and downwardly relative to said side wall as said lid is raised and lowered relative to said housing; and a safety latch including an upper latch part connected to said lid and a lower latch part connected to said housing, said upper and lower latch parts being aligned when said lid is in its said closed position, said upper latch part defining a vented opening into the interior of said housing, said lower latch part carrying a plunger, said plunger having an inward position in which it protrudes into the upper latch part to seal said vented opening and an outward position from the vented opening allowing venting of said housing interior.

2. The pressure vessel of claim 1 wherein, with said plunger in its said inward position, said upper and lower latch parts are prevented from moving laterally relative to each other with said lid being secured in its said closed position.

3. The pressure vessel of claim 1 and shielding at said lid where said lid spans said housing opening.

4. A pressure vessel comprising:

a housing including a side wall defining an opening into said housing;

a lid spanning said opening, each of said side wall and lid including mutually engaging parts for securing said lid to said housing when said lid is in a closed position, said lid being rotatable relative to said housing from the closed into an open position whereby the lid can be removed from said housing;

a drive connected between said lid and housing, whereby the lid can be rotated between its open and closed positions;

a second drive connected to said housing and extending between the housing and said lid for raising the lid relative to the housing to expose said housing opening;

a davit having an upper end secured to said lid and a lower end slidably supported against said housing side wall, said davit lower end shifting upwardly and downwardly relative to said side wall as said lid is raised and lowered relative to said housing;

said second drive including a power actuator connected between said housing and said davit lower end, and a safety latch including an upper latch part connected to said lid and a lower latch part connected to said housing, said upper and lower latch parts being aligned when said lid is in its said closed position, said upper latch part defining a vented opening into the interior of said housing, said lower latch part carrying a plunger, said plunger having an inward position in which it protrudes into the upper latch part to seal said vented opening and an outward position from the vented opening allowing venting of said housing interior.

5. The pressure vessel of claim 4 wherein said lid is pivotally connected to said davit upper end so as to be rotatable about a vertical axis.

\* \* \* \* \*